United States Patent [19]

Schaefer

[11] Patent Number: 4,621,498
[45] Date of Patent: Nov. 11, 1986

[54] TANDEM MASTER CYLINDER

[75] Inventor: Ernst-Dieter Schaefer, Bad Nauheim, Fed. Rep. of Germany

[73] Assignee: ITT Industries, Inc., New York, N.Y.

[21] Appl. No.: 742,918

[22] Filed: Jun. 10, 1985

Related U.S. Application Data

[63] Continuation of Ser. No. 544,840, Oct. 24, 1983, abandoned.

[30] Foreign Application Priority Data

Nov. 3, 1982 [DE] Fed. Rep. of Germany ....... 3240542

[51] Int. Cl.[4] ............................................. B60T 11/20
[52] U.S. Cl. ........................................ 60/562; 60/578; 60/589
[58] Field of Search .................. 60/562, 574, 589, 578

[56] References Cited

U.S. PATENT DOCUMENTS

| 2,776,538 | 1/1957 | Schnell ................................. 60/578 |
| 3,140,587 | 7/1964 | Stelzer ................................. 60/562 |
| 3,296,798 | 1/1967 | Shutt ................................... 60/562 |
| 3,312,062 | 4/1967 | MacDuff ............................. 60/562 |
| 3,545,206 | 12/1970 | Belart ................................. 60/562 |
| 4,086,770 | 5/1978 | Shaw .................................. 60/574 |
| 4,132,073 | 1/1979 | Ewald ................................. 60/562 |
| 4,330,995 | 5/1982 | Miyakawa .......................... 60/562 |

FOREIGN PATENT DOCUMENTS

| 1170802 | 5/1964 | Fed. Rep. of Germany ........ 60/562 |
| 1102929 | 2/1968 | United Kingdom ................. 60/562 |

Primary Examiner—Abraham Hershkovitz
Attorney, Agent, or Firm—James B. Raden; Donald J. Breh

[57] ABSTRACT

In a tandem master cylinder for a vehicle hydraulic brake system having a push-rod piston designed as stepped piston and an intermediate piston designed as stepped piston both pistons being aligned in a stepped bore of the cylinder housing for the purpose of obtaining a particularly short and compact design. The working cylinder communicates with the connecting bore of the one brake circuit provided in the large-diameter step of the intermediate piston, while the small-diameter step of the intermediate piston fits in the working cylinder formed by the small-diameter step of the stepped bore so that the working cylinder is in communication with the other brake circuit via the connecting bore.

5 Claims, 1 Drawing Figure

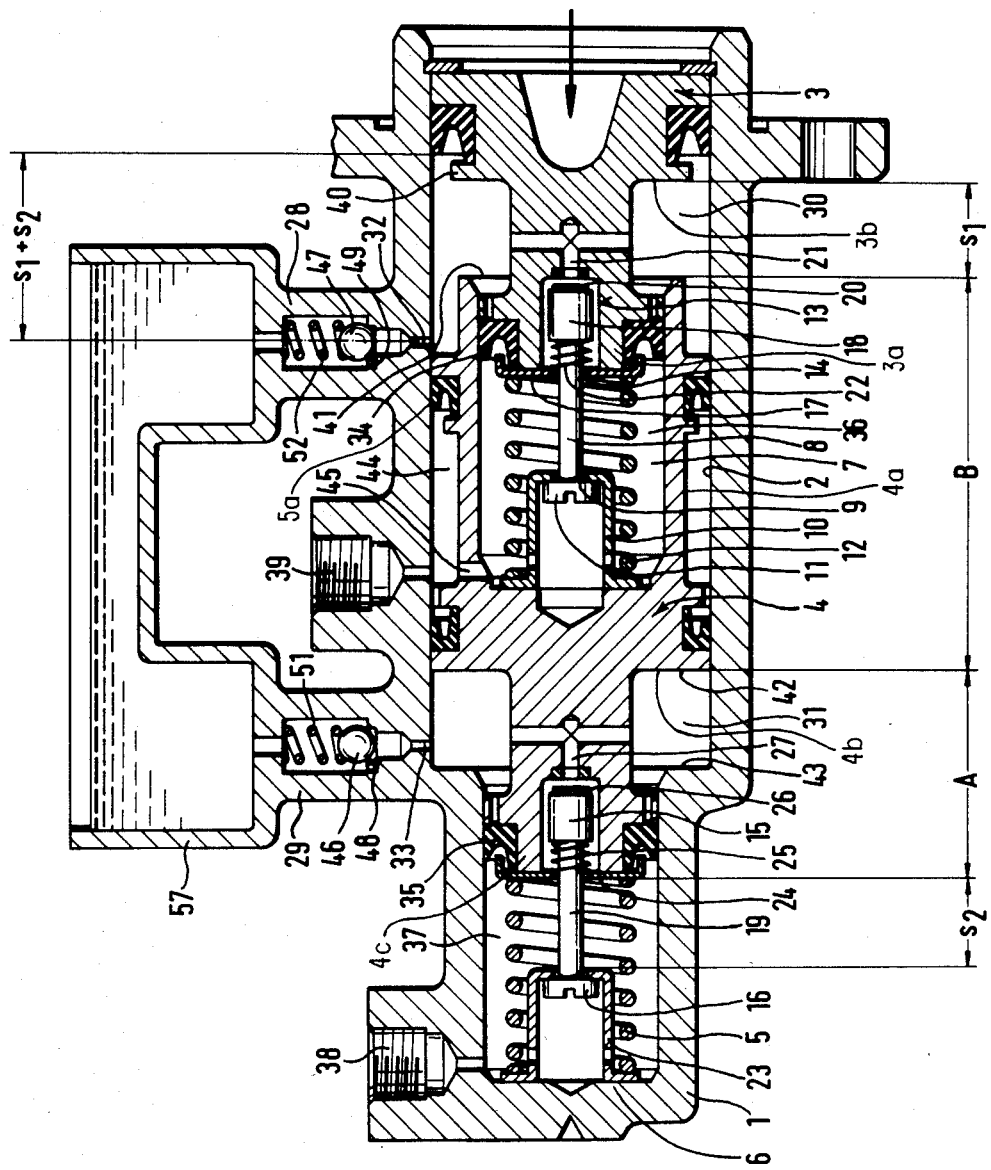

TANDEM MASTER CYLINDER

This is a continuation application Ser. No. 544,840, filed Oct. 24, 1983 now abandoned.

Known from German printed and published patent application No. 28 49 045 is a tandem master cylinder, wherein the cylinder housing contains one single piston bore, the diameter of which is dimensioned alike for both pistons arranged in series, the housing of the tandem master cylinder confining laterally the two working pistons. A disadvantage of this known tandem master cylinder is its large overall length and its relatively great operating stroke.

SUMMARY OF THE INVENTION

The present invention relates to a tandem master cylinder for a vehicle hydraulic brake system, with a cylinder housing in whose cylinder bore a push-rod piston and an intermediate piston are axially slidably accommodated. A piston spring is arranged in the cylinder chamber between the push-rod piston and the intermediate piston which bears with its one end against the push-rod piston and bears with its other end against a stop sleeve. A guide pin abuts with its one end on the push-rod piston which projects coaxially into the cylinder chamber between the push-rod piston and intermediate piston, with its other end extends through a recess of the stop sleeve to produce a cylinder of compact construction responsive to a short pedal stroke.

This object will be achieved according to the present invention in that the intermediate piston designed as a stepped piston contains in its larger-diameter step a cylindrical bore which forms a working cylinder into which the push-rod piston is fitted at its end remote from the push rod. A circumferential groove is provided in the peripheral surface of the intermediate piston in the area of the larger-diameter step, the groove forming a channel together with the larger-diameter stepped bore of the cylinder housing an annular chamber. The chamber is connected by way of the channel to the working cylinder. In addition, the connecting bore is in communication with one brake circuit, while the smaller-diameter step of the intermediate piston rides in the bore forming a working cylinder at the end of the cylinder housing remote from the actuating side, the working cylinder being connected via a connecting bore to the other brake circuit.

To enable the supply of the pressure fluid from the pressure fluid supply reservoir through the chamber constituting the charging means into the working cylinder prior to the brake application, the push-rod piston contains a bore which connects the chamber that forms a working cylinder in front of the push-rod piston to the chamber that acts as charging means. The bore is closable by the head portion acting as valve member by means of the washer of the guide pin, when the push-rod piston displaces in the actuating direction. Preferably, also the intermediate piston is provided with a bore which connects the chamber acting as working cylinder in front of the intermediate piston to the chamber acting as charging means, the latter bore being closable by the head portion acting as valve member by means of the washer of a guide pin, when the intermediate piston displaces in the actuating direction.

It is an advantage of this invention that both charging chambers are disconnected during the actuating phase and act as feed chambers in the inactive phase and also after attainment of the change-over point. Therefore, according to another embodiment of the invention, the bores which interconnect the pressure fluid supply reservoir and the chambers act as charging means to accomodate spring-loaded valve bodies which allow the pressure fluid to return into the pressure fluid supply reservoir upon displacement of the push-rod piston and the intermediate piston in the direction of movement. The bores are provided with longitudinal grooves, notches or flutes which allow the flow of the pressure fluid from the pressure fluid supply reservoir into the chambers during movement of the pistons in opposition to their actuating direction and with the valve bodies being in abutment on their valve seats.

The present invention may be configured in various embodiments. One such embodiment is illustrated in the accompanying drawing which is a longitudinal crosssection through the tandem master cylinder of the present invention.

DETAILED DESCRIPTION

The tandem master cylinder illustrated comprises a cylinder housing 1 which a stepped bore 2 in which there are slidably arranged in series a push-rod piston 3 having a large diameter piston portion 3a actuatable by a push rod (not shown) and a smaller diameter piston portion 3b and an intermediate piston 4. The intermediate piston 4 is biased away from the cylinder bottom 6 by a compression spring 5. The intermediate piston 4 includes a coaxial tubular extension portion 4a having a diameter less than the diameter of the larger diameter section of the bore 2 creating a working cylinder chamber 7. The tubular extension 4a is sealed to the bore 2 by a seal 5a and creates an annual chamber 44 which is connected by a passage 45 to the working cylinder 7 and by the connection 39 to a wheel brake unit (not shown). The seal 5a further subdivides the large diameter section of the bore 2 into a fill chamber 30. Disposed in the cylinder chamber 7 between push-rod piston 3 and intermediate piston 4 is a coaxially extending headed guide pin 8 which is aligned in the chamber 7 of push-rod piston 3. The guide pin projects with its free end through a concentric recess 9 of a flanged stop sleeve 10 secured to the intermediate piston 4. Motion of the guide pin 8 away from the intermediate piston 4 is limited by an enlarged portion at the free end of the guide pin 8 which forms a stop 11 in conjunction with the inturned base of the stop sleeve.

Arranged between the push-rod piston 3 and the stop sleeve 10 is a preloaded piston spring 12 which pushes against the stop sleeve flange to bias the stop sleeve 10 in the direction away from the push-rod piston 3.

The stop sleeve 10 is composed of a hat-like designed sheet-metal part with an outward flange at the one end and an inturned base at the other.

The guide pin 8 illustrated is a solid material bar which has its one end inserted into an axial bore 13 formed in the push-rod piston 3 and is provided wtih a head portion 18 in the area of the axial bore 13. A disc 17 covers the central bore 14 through which the stem of the guide pin 8 extends. The guide pin 8 moves selfactingly to the left in the direction of the intermediate piston 4. Besides, the guide pin at the end face of its head portion 18 is provided with a washer 20 made from elastic material, the washer forming a valve together with the bore 21 in the push-rod piston 3. The head portion 18 of the guide pin 8 is biased toward the push rod piston 3 by a weak compression spring 22 extending between the disc 17 and the head portion 18. In the event of a relative movement between the push-rod piston 3 and the intermediate piston 4, the spring 22 allows the washer 20 to close the bore 21 in the push-rod piston 3.

The intermediate piston 4, is a stepped piston having a longer diameter section of axial length B defining the tubular extension 4a and a large diameter piston portion 4b and a smaller diameter section of axial length A defining a smaller diameter piston portion 4c. The intermediate piston is fastened via a top hat-shaped stop sleeve 23 to the cylinder bottom 6 of the cylinder housing 1 by means of a guide pin 19 which latter corresponds to the previously described guide pin 8. The head portion of pin 19 is designated by numeral 15 and the end forming a stop is designated by reference numeral 16. Arranged between head portion 15 and disc 24 is a weak spring 25 which biases the washer 26 to close the bore 27 in the intermediate piston 4 in the event of a relative movement of the intermediate piston 4 towards the cylinder bottom 6.

On top of the cylinder housing 1, the pressure fluid supply reservoir 57 is connected to the two chambers 30 and 31, respectively, via the two sockets 28, 29.

The mode of operation of the tandem master cylinder is as follows: first the pressure fluid propagates from the pressure fluid supply reservoir 57 through both bores 32 and 33 into both chambers 30 and 31. The fluid flows past the washers 34 and 35 into the working cylinders 36 and 37. The pressure fluid is also able to enter into the working cylinders 36 and 37 through the bores 21 and 27 in the initial phase. When the push-rod piston 3 is shifted in the direction of the arrow, the pressure fluid prevailing in the working cylinders 36 and 37 will be transmitted to the wheel cylinders (not shown in detail) via the connecting bore 38 and via the bore 45, annular chamber 44 and the connecting bore 39. In this process, the pressure developing in the working cylinder 36 by the smaller diameter piston portion 3a of the push rod piston 3 will act upon the intermediate piston 4 which, in turn, acts on the pressure fluid prevailing in the working cylinder 37.

In the event of a defect in the brake circuit connected to the connecting bore 39, the push-rod piston 3 will move to the left in the direction of the arrow until the shoulder 40 is in abutment with the annular end face 41 of the intermediate piston 4; subsequently, the push-rod piston 3 will act upon the intermediate piston directly in the direction of the arrow so that the braking pressure desired can develop in the working cylinder 37.

In the event of a defect in the brake circuit connected to the connecting bore 38, the intermediate piston 4 will move to the left in the direction of the arrow unimpeded, until the shoulder 42 is in abutment with the step 43 of the cylinder housing. Subsequently, the braking pressure desired can be developed in the working cylinder 36.

The tandem master cylinder described utilizes, in the brake circuit of the push-rod piston 3, the pressure fluid available in the chamber 30 as a charging medium and utilizes, in the brake circuit of the intermediate piston 4, as charging medium the pressure fluid available in the chamber 31, with the bores 32 and 33 leading to both chambers 30 and 31 being closable by valve bodies 46 and 47. Flutes 48 and 49 in the bores 32 and 33 respectively permit, a small quantity of pressure fluid to flow from the pressure fluid supply reservoir into the chambers 30 and 31. The force of the springs 51 and 52 acting on the valve bodies 46 and 47 determines the charging pressure the brake system requires. Instead of the flutes 48 and 49 special valves (not illustrated in detail) may be provided.

In comparison to known tamdem brake cylinders, the tandem master cylinder with two charging chambers as shown herein results in particular from the travel stroke of the intermediate piston s/2 not being contained in the travel stroke s/1 of the push-rod piston 3.

I claim:

1. A tandem master cylinder for a hydraulic brake system of a vehicle comprising:
   a cylinder housing including a stepped bore having a large diameter portion and a small diameter portion;
   a stepped push rod piston including a large diameter piston portion at one end thereof sealingly, slidably mounted in said large diameter portion of said bore and a small diameter piston portion at an end opposite said large diameter portion thereof;
   a stepped intermediate piston including a central large diameter piston portion sealingly, slidably mounted in said large diameter portion of said bore, a small diameter piston portion at one end thereof sealingly, slidably mounted in said small diameter portion of said bore defining a first working cylinder adapted to be connected to a first pair of wheel brakes, said small diameter piston portion and said large diameter piston portion of said intermediate piston and said bore defining a first annular fill chamber connected to a fluid resevoir said intermediate piston further including a coaxial tubular extension portion at an end opposite said small diameter piston portion thereof said small diameter piston portion of said push rod piston sealingly, slidably mounted in said tubular extension defining a second working cylinder, said tubular extension having a diameter less than said large diameter portions of said bore and being sealingly slidably mounted therein defining an annular chamber between said tubular extension and said large diameter portion of said bore, said annular chamber connected to said second working cylinder and adapted to be connected to a second pair of wheel brakes, said extension, said large diameter portion of said bore and said large diameter piston portion of said push rod piston defining a second annular fill chamber connected to said resevoir;
   an axial passage in each of said push rod piston and said intermediate piston extending from a respective working cylinder through the small diameter piston portions thereof to a respective fill chamber;
   valve means in each said passageway, each said valve means including a head portion of a guide pin having a washer thereon engaging a base of said passageway in each said piston;
   means normally maintaining both valve means in an open position to provide communication between each said working cylinder and each said fill chamber, and acting between the opposite end of the head of said guide pin and a disc mounted at the base of each said small diameter piston portion head end; and
   means for automatically closing the respective valve means on axial movement of the respective push rod and intermediate pistons, whereby said working cylinders are in communication only with the respective wheel brake circuits with the respective valve means in a closed condition.

2. A tandem master cylinder as claimed in claim 1 in which there is a second piston spring with one end bearing against the smaller diameter piston portion of said intermediate piston and its other end bearing against the cylinder small diameter bore end.

3. A tandem master cylinder as claimed in claim 1 in which the passageway through each piston comprises radial entrance passages from the respective chamber leading to an axial passage through the respective smaller diameter piston portion to the respective working cylinder.

4. A tandem master cylinder as claimed in claim 1, in which there is a second piston spring in said first working cylinder supported on one end thereof by an end wall of said housing and on an opposite end thereof by the small diameter piston portion of said intermediate piston.

5. A tandem master cylinder for a hydraulic brake system of a vehicle comprising:
   a cylinder housing including a stepped bore having a large diameter portion and a small diameter portion;
   a stepped push rod piston including a large diameter piston portion at one end thereof sealingly, slidably mounted in said large diameter portion of said bore and a small diameter piston portion at an end opposite said large diameter portion thereof;
   a stepped intermediate piston including a central large diameter piston portion sealingly, slidably mounted in said large diameter portion of said bore, a small diameter piston portion at one end thereof sealingly, slidably mounted in said small diameter portion of said bore defining a first working cylinder adapted to be connected to a first pair of wheel brakes, said small diameter piston portion and said large diameter piston portion of said intermediate piston and said bore defining a first annular fill chamber connected to a fluid resevoir said intermediate piston further including a coaxial tubular extension portion at an end opposite said small diameter piston position thereof said small diameter piston portion of said push rod piston sealingly slidably mounted in said tubular extension defining a second working cylinder, said tubular extension having a diameter less than said large diameter portion of said bore and being sealingly, slidably mounted therein defining an annular chamber between said tubular extension and said large diameter portion of said bore, said annular chamber connected to said second working cylinder and adapted to be connected to a second pair of wheel brakes, said extension, said large diameter portion of said bore and said large diameter piston portion of said push rod piston defining a second annular fill chamber connected to said resevoir;
   a first passage in said intermediate piston between said first working cylinder and said first annular fill chamber;
   first normally open valve means in said first passage adapted to close upon a predetermined degree of movement of said intermediate piston;
   a second passage in said push rod piston between said second working cylinder and said second fill chamber;
   second normally open valve means in said second passage adapted to close upon a predetermined degree of movement of said push rod piston; and
   a piston spring in said tubular extension supported on one end by said intermediate piston and on an opposite end thereof by the small diameter piston portion of said push rod piston.

* * * * *